US012590909B2

(12) United States Patent
Sugimoto et al.

(10) Patent No.: US 12,590,909 B2
(45) Date of Patent: Mar. 31, 2026

(54) X-RAY INSPECTION APPARATUS AND SENSITIVITY CORRECTION METHOD FOR X-RAY INSPECTION APPARATUS

(71) Applicant: ISHIDA CO., LTD., Kyoto (JP)

(72) Inventors: Kazuyuki Sugimoto, Ritto (JP); Keisuke Yoshida, Ritto (JP); Futoshi Yurugi, Ritto (JP); Osamu Hirose, Ritto (JP)

(73) Assignee: ISHIDA CO., LTD., Kyoto (JP)

( * ) Notice: Subject to any disclaimer, the term of this patent is extended or adjusted under 35 U.S.C. 154(b) by 163 days.

(21) Appl. No.: 18/602,894

(22) Filed: Mar. 12, 2024

(65) Prior Publication Data

US 2024/0310302 A1    Sep. 19, 2024

(30) Foreign Application Priority Data

Mar. 14, 2023    (JP) ................................ 2023-039353

(51) Int. Cl.
*G01N 23/00*        (2006.01)
*G01N 23/04*        (2018.01)

(52) U.S. Cl.
CPC ....... *G01N 23/04* (2013.01); *G01N 2223/303* (2013.01)

(58) Field of Classification Search
CPC ............................................... G01N 2223/643
See application file for complete search history.

(56) References Cited

U.S. PATENT DOCUMENTS

| | | | |
|---|---|---|---|
| 5,943,388 A | 8/1999 | Tumer | |
| 10,422,757 B2 | 9/2019 | Sugimoto et al. | |
| 2017/0119325 A1 | 5/2017 | Tamura | |
| 2020/0363347 A1* | 11/2020 | Siegrist | .................. G01N 33/02 |

(Continued)

FOREIGN PATENT DOCUMENTS

| | | |
|---|---|---|
| JP | 2001-004560 A | 1/2001 |
| JP | 5558538 A | 7/2013 |

(Continued)

OTHER PUBLICATIONS

The extended European Search Report dated Jul. 23, 2024.

(Continued)

*Primary Examiner* — Dani Fox
(74) *Attorney, Agent, or Firm* — Spencer Fane LLP

(57)        ABSTRACT
The X-ray inspection apparatus includes a conveying unit configured to convey an article, an X-ray source configured to irradiate the article conveyed by the conveying unit with X-rays, an X-ray detection unit capable of detecting the X-rays by photon counting, and an inspection unit configured to inspect the article based on an output result of the X-ray detection unit, where, in a sensitivity correction of the X-ray detection unit performed when the X-ray inspection apparatus is activated, after a lapse of a predetermined period from a start of detection of X-rays, the X-ray detection unit is configured to detect X-rays not transmitting the article, and the X-ray source is configured to start X-ray irradiation during the predetermined period, and where the predetermined period is equal to or longer than a period in which irradiation of the X-ray source is stabilized.

5 Claims, 3 Drawing Sheets

(56) References Cited

U.S. PATENT DOCUMENTS

2023/0284991 A1    9/2023  Iwakawa et al.

FOREIGN PATENT DOCUMENTS

| JP | 2022-049924 | A | 3/2022 |
| JP | 2023-132587 | A | 9/2023 |

OTHER PUBLICATIONS

"Giaccaglia Camilla et al, ""Characterization of a Dectris EIGER2 X CdTe 1M-W detector for medicalimaging Tesi di Laurea Magistrale in Nuclear Engineering—Ingegneria Nucleare"", Politecnico Milano 1863, Apr. 28, 2022, p. 74,95,96, XP093180953".
De Cesare Cinzia, "FPGA-based algorithms for the stability improvement of high-flux X-ray spectrometric imaging detectors", HAL open science, Apr. 11, 2019, p. 71-p. 73, XP055779830.

* cited by examiner

X-RAY INSPECTION APPARATUS AND SENSITIVITY CORRECTION METHOD FOR X-RAY INSPECTION APPARATUS

CROSS REFERENCE TO RELATED APPLICATIONS

This application claims the benefit of priority to Japanese Patent Application Number 2023-039353 filed on Mar. 14, 2023. The entire contents of the above-identified application are hereby incorporated by reference.

TECHNICAL FIELD

One aspect of the present disclosure relates to an X-ray inspection apparatus and a sensitivity correction method for the X-ray inspection apparatus.

BACKGROUND

As a conventional X-ray inspection apparatus, for example, an apparatus described in JP2001-4560 A is known. An X-ray inspection apparatus described in JP2001-4560 A includes means for determining whether or not an element of a detector is irradiated with an X-ray without an inspection object, and calculates an offset data at the time of X-ray OFF and a sensitivity correction coefficient from a data at the time of X-ray ON during a period of a re-correction data acquisition span during movement of a conveyor. In addition, the X-ray inspection apparatus acquires raw data during the re-correction data acquisition span when X-rays are turned on, and automatically updates an inter-element sensitivity correction table via online at any time.

The output of the X-ray source is likely to be unstable due to heat generation, particularly immediately after startup. In addition, a direct conversion type sensor capable of detecting X-rays by photon counting is sometimes used in the X-ray inspection apparatus. Such a direct conversion type sensor performs counting processing of X-rays by itself, but the direct conversion type sensor generates heat in accordance with the counting processing. Therefore, when the sensitivity correction processing as described in JP 2001-4560A1 is performed immediately after the X-ray inspection apparatus is activated, there is a problem that the output of the sensor is not stable.

An object of one aspect of the present disclosure is to provide an X-ray inspection apparatus and a sensitivity correction method of the X-ray inspection apparatus capable of performing appropriate sensitivity correction even when a direct conversion type detection unit is used.

SUMMARY (1) An X-ray inspection apparatus according to one aspect of the present disclosure includes a conveying unit config-ured to convey an article, an X-ray source configured to irradiate the article conveyed by the conveying unit with X-rays, an X-ray detection unit capable of detecting X-rays by photon counting, the X-ray detection unit being a direct conversion type detection unit, and an inspection unit con-figured to inspect the article based on an output result of the X-ray detection unit. In a sensitivity correction of the X-ray detection unit performed when the X-ray inspection appa-ratus is activated, after a lapse of a predetermined period from a start of detection of X-rays, the X-ray detection unit is configured to detect an X-ray not transmitting the article and serving as a reference for the sensitivity correction, and the X-ray source is configured to start X-ray irradiation during the predetermined period, and where the predeter-mined period is equal to or longer than a period in which irradiation of the X-ray source is stabilized.

According to this X-ray inspection apparatus, in the sensitivity correction of the X-ray detection unit performed at the time of activation of the X-ray inspection apparatus, the X-ray detection unit detects X-rays serving as a refer-ence for the sensitivity correction and not transmitting through the article after a lapse of a predetermined period from a start of detection of X-rays. As a result, the output of the X-ray detection unit is stabilized, and noise is less likely to occur, compared to a case in which sensitivity correction is performed immediately after activation of the X-ray inspection apparatus. Further, the X-ray source starts the X-ray irradiation during a predetermined period, and the predetermined period is equal to or longer than a period in which the irradiation of the X-ray source is stabilized. Accordingly, since the X-ray irradiation of the X-ray source is also stabilized until the output of the X-ray detection unit is stabilized, the output of the X-ray detection unit is further stabilized. Therefore, even the X-ray inspection apparatus including the X-ray detection unit which is a direct conver-sion type detection unit can perform appropriate sensitivity correction processing. Further, by stabilizing the output of the X-ray source within a predetermined period, it is pos-sible to shorten a period from the start of the X-ray inspec-tion apparatus to the start of the sensitivity correction.

(2) In the X-ray inspection apparatus according to the above (1), the X-ray detection unit may acquire the bright-ness level based on the X-ray not transmitting through the article after the lapse of the predetermined period in the sensitivity correction. In this case, more appropriate sensi-tivity correction can be performed.

(3) In the X-ray inspection apparatus according to the above (1) or (2), in sensitivity correction, X-ray irradiation by the X-ray source may be started simultaneously with the start of detection of X-rays by the X-ray detection unit. In this case, the X-ray irradiation can be reliably stabilized until the predetermined period has elapsed.

(4) In the X-ray inspection apparatus according to any one of (1) to (3), the predetermined period may be 10 seconds or more. In this case, the output of the X-ray detection unit can be satisfactorily stabilized.

(5) A sensitivity correction method for an X-ray inspec-tion apparatus according to another aspect of the present disclosure which includes a conveying unit configured to convey an article, an X-ray source configured to irradiate the article conveyed by the conveying unit with X-rays, an X-ray detection unit capable of detecting X-rays by photon counting, the X-ray detection unit being a direct conversion type detection unit, and an inspection unit configured to inspect the article based on an output result of the X-ray detection unit, includes starting a detection of X-rays by the X-ray detection unit when the X-ray inspection apparatus is activated, detecting an X-ray not transmitting the article and serving as a reference for the X-ray detection unit, after a lapse of a predetermined period from the start of the detec-tion of the X-rays, and where, during the predetermined period, X-ray irradiation by the X-ray source is started and stabilized.

In this sensitivity correction method, the starting detection of X-rays by an X-ray detection unit when an X-ray inspec-tion apparatus is started, and the detecting X-rays serving as a reference of the X-ray detection unit and not transmitting through an article after a lapse of a predetermined period from the start of detection of X-rays are performed. As a result, the output of the X-ray detection unit is stabilized, and noise is less likely to occur, compared to a case in which sensitivity correction is performed immediately after activation of the X-ray inspection apparatus. In the sensitivity correction method, irradiation of X-rays by the X-ray source is started and the irradiation is stabilized during a predetermined period. Accordingly, since the X-ray detection unit of the X-ray source is also stabilized until the output of the X-ray detection unit is stabilized, the output of the X-ray detection unit is further stabilized. Therefore, even the X-ray inspection apparatus including the X-ray detection unit which is a direct conversion type detection unit can perform appropriate sensitivity correction processing. Further, by stabilizing the output of the X-ray source within a predetermined period, it is possible to shorten a period from the start of the X-ray inspection apparatus to the start of the sensitivity correction.

DETAILED DESCRIPTION

Figure 1:
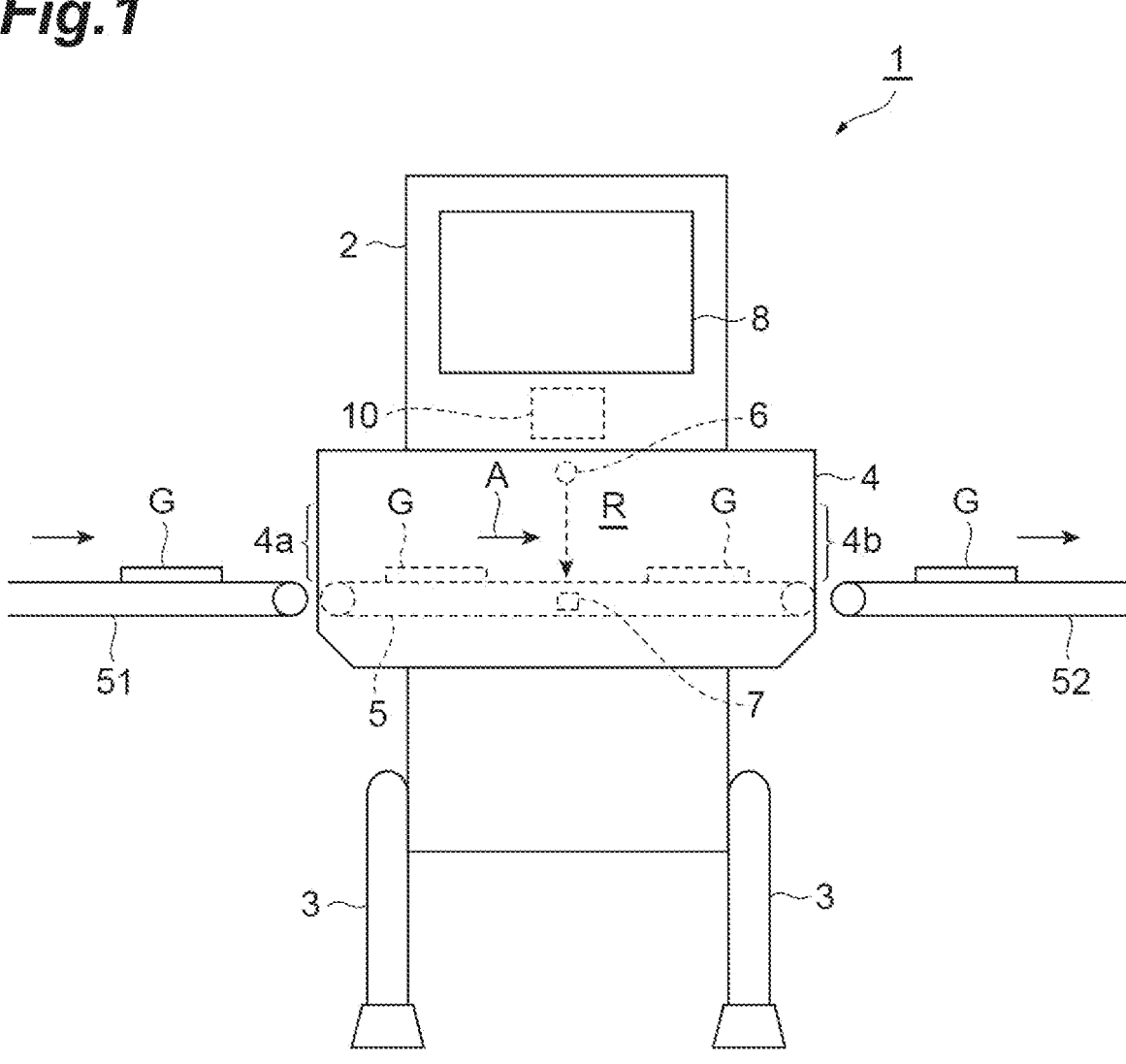
FIG. 1 is a configuration diagram of an X-ray inspection apparatus according to an embodiment.

Hereinafter, preferred embodiments of the present disclosure will be described in detail with reference to the accompanying drawings. In the description of the drawings, the same or corresponding elements are denoted by the same reference numerals, and redundant description is omitted. In the claims and the specification, the phrase "A or B" means that either A or B is included, and it is also acceptable to include both A and B.

As shown in FIG. 1, the X-ray inspection apparatus 1 includes a main body 2, a support leg 3, a shield box 4, a conveying unit 5, an X-ray irradiation unit 6, an X-ray detection unit 7, a display operation unit 8, and a control unit 10. X-ray inspection apparatus 1 generates an X-ray transmission image of article G while conveying the article G, and performs inspection of the article G based on the X-ray transmission image. Article G before inspection is carried into the X-ray inspection apparatus 1 by the carry-in conveyor 51. The inspected article G carried out of the X-ray inspection apparatus 1 by a carry-out conveyor 52.

The main body 2 accommodates a control unit 10 and the like. The support leg 3 supports the main body 2. The shield box 4 is provided in the main body 2. The shield box 4 is a housing that prevents leakage of X-rays (electromagnetic waves) to the outside. Inside the shield box 4, an inspection room R is formed in which inspection of the article G by X-rays is performed. A carry-in port 4a and a carry-out port 4b are formed in the shield box 4. Article G before inspection is carried into the inspection room R from the carry-in conveyor 51 via the carry-in port 4a. Article G after inspection are carried out from the inspection room R to the carry-out port 4b via the carry-out conveyor 52.

The conveying unit 5 is a member that conveys article G, and is disposed so as to pass through the center of the shield box 4. The conveying unit 5 conveys article G along the conveyance direction A from the carry-in port 4a to the carry-out port 4b via the inspection room R. The conveying unit 5 is, for example, a belt conveyor stretched between the carry-in port 4a and the carry-out port 4b. Note that the conveying unit 5 may protrude outward from the carry-in port 4a and the carry-out port 4b.

Figure 2:
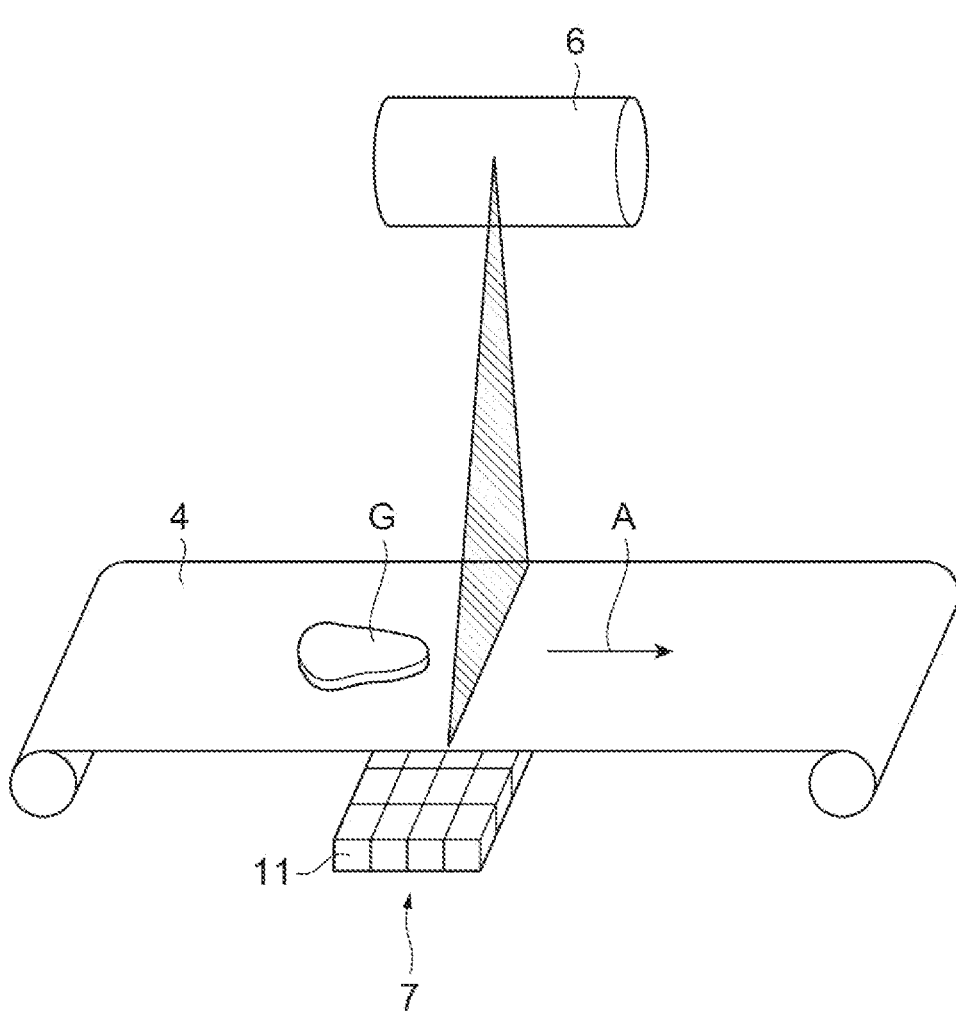
FIG. 2 is a schematic configuration diagram of an inside of the shield box shown in FIG. 1.

As shown in FIGS. 1 and 2, the X-ray irradiation unit 6 is an electromagnetic wave irradiation unit (X-ray source) disposed in the shield box 4. The X-rays irradiated from the X-ray irradiation unit 6 include X-rays in various energy regions from low energies (long wavelengths) to high energies (short wavelengths). Therefore, the X-ray irradiation unit 6 irradiates the article G conveyed by the conveying unit 5 with X-rays in a plurality of energy regions. Immediately after the start of the X-ray irradiation unit 6, the output of X-rays may be unstable. Thus, X-ray irradiation by the X-ray irradiation unit 6 (i.e., idling of the X-ray irradiation unit 6) may be performed after activation of the X-ray inspection apparatus 1 and prior to inspection of the article G. Note that "low" and "high" in the above-described low energy and high energy indicate relatively "low" and "high" in a plurality of energy regions irradiated from the X-ray irradiation unit 6, and do not indicate a specific range.

The X-ray detection unit 7 is a sensor unit that detects electromagnetic waves. The X-ray detection unit 7 is disposed in the shield box 4 and at a position facing the X-ray irradiation unit 6 in a vertical direction. In one example, the X-ray detection unit 7 is a direct conversion type detection unit capable of detecting X-rays by photon counting, and includes, for example, a sensor 11 (multi-energy sensor) that detects X-rays in each of a plurality of energy regions transmitted through the article G. For example, the sensor 11 is arranged in a direction (width direction) orthogonal to at least the conveyance direction of the conveying unit 5 and the vertical direction. The sensor 11 may be aligned not only in the width direction but also in the conveyance direction. In one example, an X-ray detection unit 7 includes a group of sensors 11 arranged in two dimensions. The sensor 11 includes, for example, a photon detecting sensor such as a CdTe semiconductor detector.

In the sensor 11 included in the X-ray detection unit 7, for example, electron-hole pairs are generated by arrival of photons of X-rays. Photon counting is performed based on the energy (photon energy) obtained at this time. The counting process is performed by a processor (not shown) included in the X-ray detection unit 7 or the sensor 11. Since a calculation load of the counting process is high, the processor is likely to generate heat during operation of the X-ray inspection apparatus 1.

In the sensitivity correction (calibration) of the X-ray detection apparatus 1 which is performed when the X-ray detection unit 7 is activated, a brightness level is acquired based on the X-rays which are not transmitted through the article G. The brightness level is the number of photon counts detected when X-rays not transmitting through the article G and entering the X-ray detection unit 7. The brightness level may be changed depending on the output of the X-ray irradiation unit 6. Therefore, the brightness level is not limited to a single value, and may be a plurality of values. For example, the brightness level includes at least a maximum brightness level obtained when the output of the X-ray irradiation unit 6 is 100% and an intermediate brightness level (gray level) obtained when the output of the X-ray irradiation unit 6 is 50%. In one example, in the sensitivity correction, acquisition of a dark level by the X-ray detection unit 7 may not be performed. In this case, the fact that the number of detected photons is simply 0 may be set in advance as the dark level. Alternatively, in the sensitivity correction, when the number of photons detected by the X-ray detection unit 7 is 0, the dark level may be set. The sensitivity correction of the X-ray detection unit 7 corresponds to correction of an output difference between each sensor 11 included in the X-ray detection unit 7.

During operation of the X-ray inspection apparatus 1, heat generated by the sensor 11 or the processor causes the temperature of the X-ray detection unit 7 to increase. Due to the temperature rise of the X-ray detection unit 7, particularly immediately after the activation of the X-ray inspection apparatus 1, the output of the X-ray detection unit 7 may become unstable. As a specific example, due to the temperature rise of the X-ray detection unit 7, the counting processing accuracy of at least one sensor 11 deteriorates, and an erroneous counting number may be output. This may produce an inappropriate X-ray image. Therefore, the X-ray detection unit 7 includes, in addition to the sensors 11, a cooling element (not shown) that cools the X-ray detection unit 7. By operating the cooling element during the operation of the X-ray inspection apparatus 1, the temperature change of the X-ray detection unit 7 can be suppressed. For example, after the lapse of the predetermined period from the start of the detection of X-rays by the X-ray detection unit 7, the X-ray detection unit 7 detects X-rays serving as a reference for the sensitivity correction and not transmitting through the article G. Then, the X-ray detection unit 7 acquires the brightness level. The predetermined period is, for example, 10 seconds or more, 8 seconds or more, 6 seconds or more, or 5 seconds or more, but is not limited thereto. The predetermined period may be adjusted depending on the type, specification, installation environment, and the like of the X-ray inspection apparatus 1. From the viewpoint of power consumption or the like, the predetermined period may be set as short as possible. The cooling element is, for example, a Peltier element.

In general, the period required from the start of X-ray detection by the X-ray detection unit 7 to the stabilization of the output of the X-ray detection unit 7 is equal to or longer than the period required from the start of X-ray irradiation by the X-ray irradiation unit 6 to the stabilization of the output of the X-ray irradiation (the period during which the irradiation of the X-ray source is stabilized). Therefore, the predetermined period is equal to or longer than the period required from the start of the detection of the X-ray by the X-ray detection unit 7 to the stabilization of the output of the X-ray detection unit 7. Similarly, the predetermined period is equal to or longer than the period in which the irradiation of the X-ray source is stabilized. Therefore, from the viewpoint of shortening the sensitivity correction of the X-ray detection unit 7, at least the detection of X-rays by the X-ray inspection apparatus 1 may be started when the X-ray detection unit is activated. From the viewpoint of output stabilization of the X-ray detection unit 7, the X-ray irradiation unit 6 starts the X-ray irradiation during the predetermined period. In this case, the X-ray irradiation is started so that the X-ray irradiation is stabilized by the end of the predetermined period. In the sensitivity correction, X-ray irradiation by the X-ray irradiation unit 6 may be started simultaneously with the start of detection of X-rays by the X-ray detection unit 7.

The X-ray detection unit 7 discriminates photon energies of detected X-rays into two or more energy regions based on an arbitrary threshold value. This allows the X-ray detection unit 7 to perform photon counting in each energy region. The X-ray detection unit 7 outputs classified signals corresponding to the detection result of the X-rays (detection result signals) to the control unit 10. The arbitrary threshold is, for example, one or more values (unit: keV) set by the control unit 10. For example, Japanese Patent Application No.

2022-37999 (JP 2023-132587) incorporated herein by reference, describes a method for setting the arbitrary threshold, or may be set using the brightness level.

As shown in FIG. 1, the display operation unit 8 is an unit (display unit) provided in the main body 2. The display operation unit 8 displays various types of information and receives input operations of various conditions from the outside. The display operation unit 8 is, for example, a liquid crystal display, and displays an operation screen as a touch panel. In this case, the operator can input various conditions via the display operation unit 8.

The control unit 10 is disposed inside the main body 2. The control unit 10 controls the operation of each part of the X-ray inspection apparatus 1. The control unit 10 is constituted by a central processing unit (CPU), a read only memory (ROM), a random access memory (RAM), and the like. A program for controlling the X-ray inspection apparatus 1 is recorded in the ROM. The control unit 10 also functions as an inspection unit that performs article G inspection based on the output result of the X-ray detection unit 7.

Figure 3:
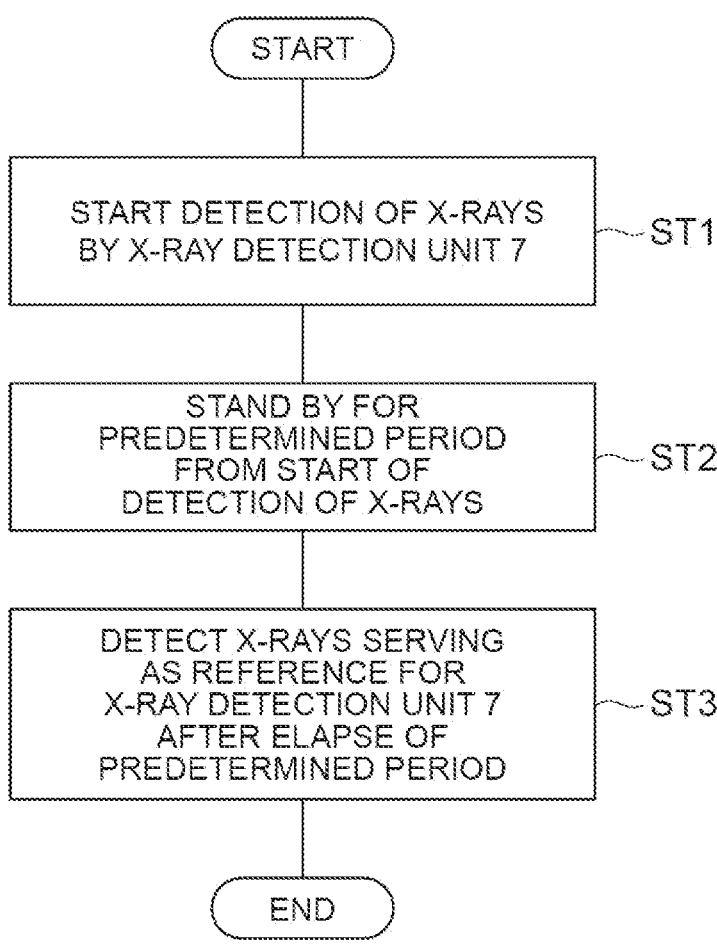
FIG. 3 is a flowchart explaining a sensitivity correction method.

Next, an example of a sensitivity correction method for the X-ray inspection apparatus 1 according to the present embodiment will be described with reference to FIG. 3. FIG. 3 is a flowchart explaining a sensitivity correction method.

As shown in FIG. 3, when the X-ray inspection apparatus 1 is started, the X-ray detection unit 7 starts to detect X-rays (step ST1). In step ST1, the X-ray detection unit 7 generates heat by starting detection of X-rays by the X-ray detection unit 7. In one example, in step ST1, irradiation of X-rays by the X-ray irradiation unit 6 is started simultaneously with detection of X-rays by the X-ray detection unit 7, but the present disclosure is not limited thereto. In step ST1, the detection result of X-rays by the X-ray detection unit 7 is not used in the sensitivity correction. Thus, an unstable detection result is less likely to be used.

Next, the process waits for a predetermined period from the start of X-ray detection by the X-ray detection unit 7 (step ST2). In step ST2, X-ray detection by the X-ray detection unit 7 is maintained for the predetermined period. At this time, the cooling element of the X-ray detection unit 7 also operates to adjust the temperature of the X-ray detection unit 7. Similarly, X-ray irradiation by the X-ray irradiation unit 6 is maintained during the predetermined period. Thus, the output of the X-ray irradiation unit 6 can be stabilized. When the X-ray irradiation by the X-ray irradiation unit 6 is not started in step ST1, the X-ray irradiation by the X-ray irradiation unit 6 is started in step ST2. In other words, when the X-ray irradiation by the X-ray irradiation unit 6 is not started in step ST1, the X-ray irradiation by the X-ray irradiation unit 6 is started during the predetermined period. In this case, the start timing of the X-ray irradiation by the X-ray irradiation unit 6 is adjusted so as to stabilize the X-ray irradiation by the X-ray irradiation unit 6 during the predetermined period. Also in step ST2, the detection result of X-rays by the X-ray detection unit 7 is not used in sensitivity correction. Thus, an unstable detection result is less likely to be used.

Subsequently, after a lapse of a predetermined period from the start of detection of X-rays by the X-ray detection unit 7 (that is, after step ST2), X-rays serving as a reference for the X-ray detection unit 7 and not transmitting through the article G are detected (step ST3). In step ST3, sensitivity correction of the X-ray detection unit 7 is performed by using the detection result of X-rays. In the sensitivity correction, for example, acquisition of a brightness level, acquisition of 0 points, calculation of a span coefficient value, and the like are performed for each sensor 11. In the sensitivity correction, the dark level may be acquired. Then, the acquired brightness level, the calculated value, and the like are set in each sensor 11 of X-ray detection unit 7. From the above, the sensitivity correction of the X-ray detection unit 7 is completed when the X-ray inspection apparatus 1 is activated. After completion of the sensitivity correction, the inspection of the article G by the X-ray inspection apparatus 1 can be well performed.

According to the X-ray inspection apparatus 1 and the sensitivity correction method thereof according to the present embodiment described above, in the sensitivity correction of the X-ray inspection apparatus 1 performed at the time of activation of the X-ray detection unit 7, the X-ray detection unit 7 detects X-rays serving as a reference for the sensitivity correction and not transmitting through article G after a lapse of a predetermined period from a start of detection of X-rays. As a result, the output of the X-ray inspection apparatus 1 is stabilized, and noise is less likely to occur, compared to a case in which sensitivity correction is performed immediately after the activation of the X-ray detection unit 7. The X-ray irradiation unit 6 starts the X-ray irradiation during a predetermined period, and the predetermined period is equal to or longer than a period in which the irradiation of the X-ray source is stabilized. Accordingly, since the X-ray irradiation of the X-ray irradiation unit 6 is also stabilized until the output of the X-ray detection unit 7 is stabilized, the output of the X-ray detection unit 7 is further stabilized. Therefore, even the X-ray inspection apparatus 1 including an X-ray detection unit 7 that is a direct conversion type detection unit can perform an appropriate sensitivity correction process. Further, by stabilizing the output of the X-ray irradiation unit 6 within the predetermined period, it is possible to shorten the time from the activation of the X-ray inspection apparatus 1 to the start of the sensitivity correction.

In one example, the X-ray detection unit 7 may obtain the brightness level based on X-rays not transmitting through the article G after the lapse of the predetermined period in sensitivity correction. In this case, more appropriate sensitivity correction can be performed.

In one example, in the sensitivity correction, X-ray irradiation by the X-ray irradiation unit 6 is started simultaneously with the start of detection of X-rays by the X-ray detection unit 7. Therefore, the X-ray irradiation can be reliably stabilized until the predetermined period has elapsed.

In one example, the predetermined period may be 10 seconds or more. In this case, the output of the X-ray detection unit 7 can be satisfactorily stabilized.

Although the embodiments of the present disclosure have been described above, the present disclosure is not necessarily limited to the above-described embodiments, and various modifications can be made without departing from the scope of the present disclosure.

What is claimed is:

1. An X-ray inspection apparatus comprising:

a conveying unit configured to convey an article;

an X-ray source configured to irradiate the article conveyed by the conveying unit with X-rays;

an X-ray detection unit capable of detecting the X-rays by photon counting, the X-ray detection unit being a direct conversion type detection unit; and an inspection unit configured to inspect the article based on an output result of the X-ray detection unit, wherein, in a sensitivity correction of the X-ray detection unit performed when the X-ray inspection apparatus is activated, after a lapse of a predetermined period from a start of detection of X-rays, the X-ray detection unit is configured to detect X-rays not transmitting the article and serving as a reference for the sensitivity correction, and the X-ray source is configured to start X-ray irradiation during the predetermined period, wherein the predetermined period is equal to or longer than a period in which irradiation of the X-ray source is stabilized, and wherein the sensitivity correction of the X-ray detection unit corresponds to correction of an output difference between each sensor included in the X-ray detection unit.

2. The X-ray inspection apparatus according to claim 1, wherein the X-ray detection unit is configured to obtain a brightness level based on the X-rays not transmitting the article after the lapse of the predetermined period.

3. The X-ray inspection apparatus according to claim 1, wherein, in the sensitivity correction, the X-ray irradiation by the X-ray source is started simultaneously with the start of detection of X-rays by the X-ray detection unit.

4. The X-ray inspection apparatus according to claim 1, wherein the predetermined period is 10 seconds or more.

5. A sensitivity correction method for X-ray inspection apparatus comprising:

a conveying unit configured to convey an article;

an X-ray source configured to irradiate the article conveyed by the conveying unit with X-rays;

an X-ray detection unit configured to detect the X-rays by photon counting, the X-ray detection unit being a direct conversion type detection unit; and an inspection unit configured to inspect the article based on an output result of the X-ray detection unit, the sensitivity correction method comprising:

starting a detection of X-rays by the X-ray detection unit when the X-ray inspection apparatus is activated;

detecting X-rays not transmitting the article and serving as a reference for the X-ray detection unit, after a lapse of a predetermined period from the starting of the detection of X-rays, wherein, during the predetermined period, X-ray irradiation by the X-ray source is started and stabilized, and wherein the sensitivity correction of the X-ray detection unit corresponds to correction of an output difference between each sensor included in the X-ray detection unit.

* * * * *